United States Patent [19]
Hobbs

[11] 3,979,904
[45] Sept. 14, 1976

[54] COMBINED CYCLE ELECTRIC POWER PLANT AND A GAS TURBINE HAVING IMPROVED LIQUID FUEL FLOW DETECTION

[75] Inventor: Milton M. Hobbs, Springfield, Pa.

[73] Assignee: Westinghouse Electric Corporation, Pittsburgh, Pa.

[22] Filed: Aug. 8, 1974

[21] Appl. No.: 495,701

[52] U.S. Cl. ............................ 60/39.14; 60/39.18 B; 60/39.27; 60/39.28 R; 60/39.29; 290/40 R
[51] Int. Cl.² ...................... F02C 7/26; F02C 9/06; F02C 9/08; F02C 9/10
[58] Field of Search ..... 60/39.28 R, 39.14, 39.18 B, 60/39.03; 290/40 R, 40 A, 40 C

[56] References Cited
UNITED STATES PATENTS

| | | | |
|---|---|---|---|
| 2,637,334 | 5/1953 | Starkey | 60/39.28 R |
| 2,933,894 | 4/1960 | Johnson | 60/39.28 R |
| 2,936,028 | 5/1960 | Gatzemeyer | 60/39.28 R |
| 3,212,261 | 10/1965 | Rose | 60/39.28 R |
| 3,517,679 | 6/1970 | Williamson | 60/39.28 R |
| 3,577,877 | 5/1971 | Warne | 60/39.28 R |
| 3,738,104 | 6/1973 | Rosa | 60/39.28 R |
| 3,766,734 | 10/1973 | Jones | 60/39.28 R |

Primary Examiner—Clarence R. Gordon
Attorney, Agent, or Firm—E. F. Possessky

[57] ABSTRACT

A combined cycle power plant includes gas and steam turbines and steam generators and a digital/analog control system. A megawatt load control system varies a fuel control signal to govern a detected power output according to a reference value. The fuel control signal determines the flow rate of fuel to the combustor of a gas turbine-generator that is adapted to use gas and liquid fuels. A flow divider comprises a plurality of gear pumps connected to rotate with a common shaft, and distributes liquid fuel equally to a plurality of nozzles of the combustor, the total liquid fuel flow to the nozzles being related to the shaft speed. The shaft speed is detected and a signal representative of the total liquid fuel flow is generated in response to the detected speed. During fuel transfer a liquid fuel valve is positioned to govern the detected liquid fuel flow according to a desired flow such that the power output that results when both the gas and liquid fuels flow to the combustor is dependent upon the level of the fuel control signal and independent of the relative levels of the gas and liquid fuel flows. Undesirable power output disturbances that typically occur during fuel transfer due to nonlinearities of fuel system components are reduced.

19 Claims, 14 Drawing Figures

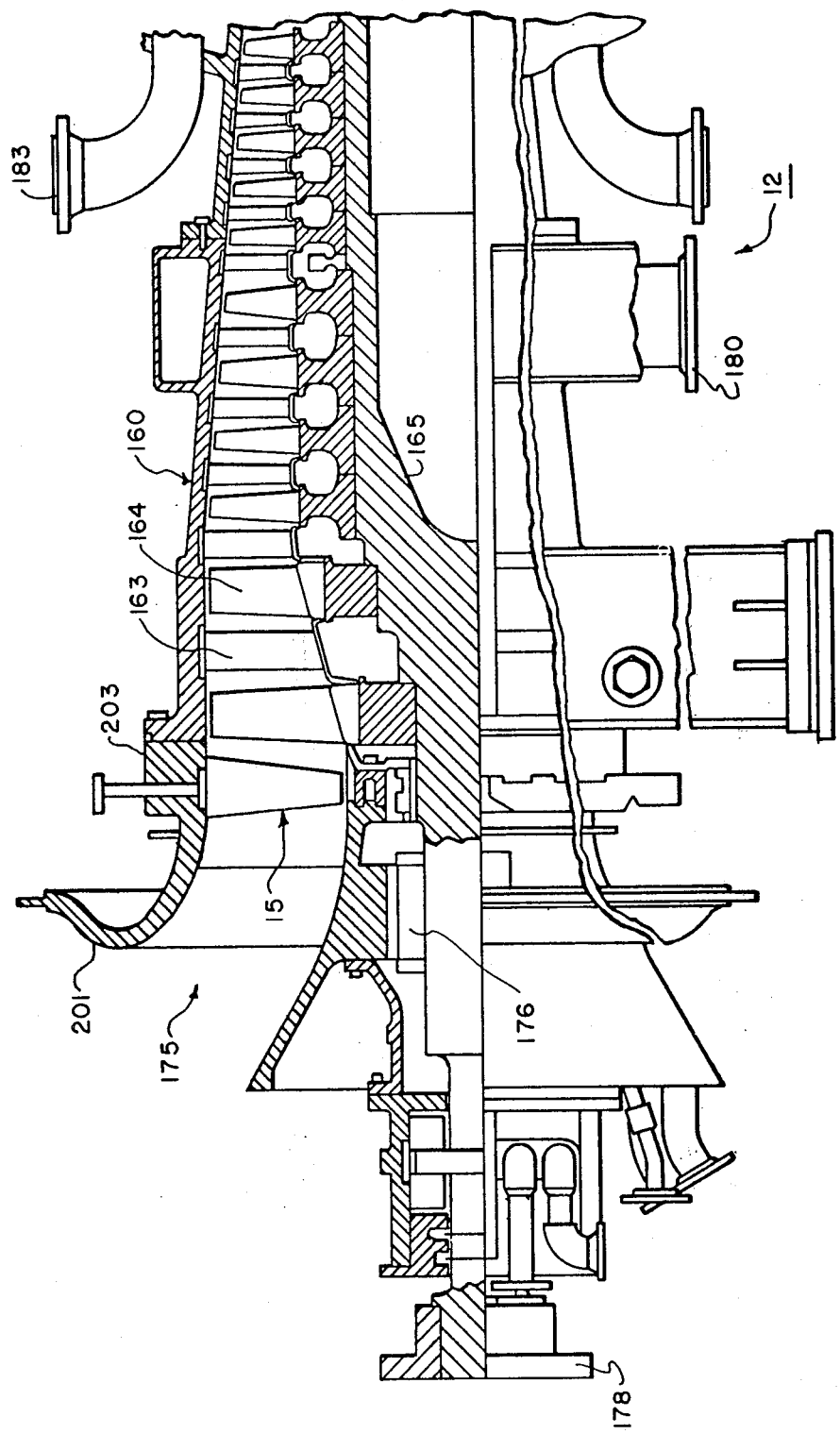

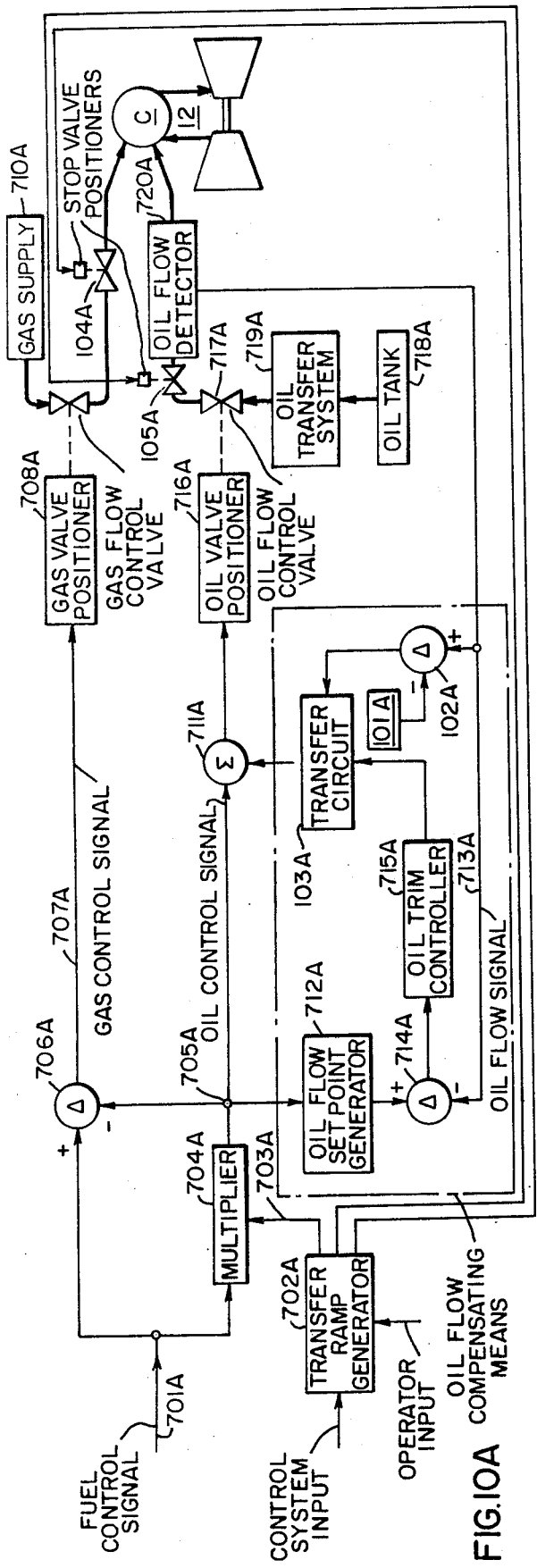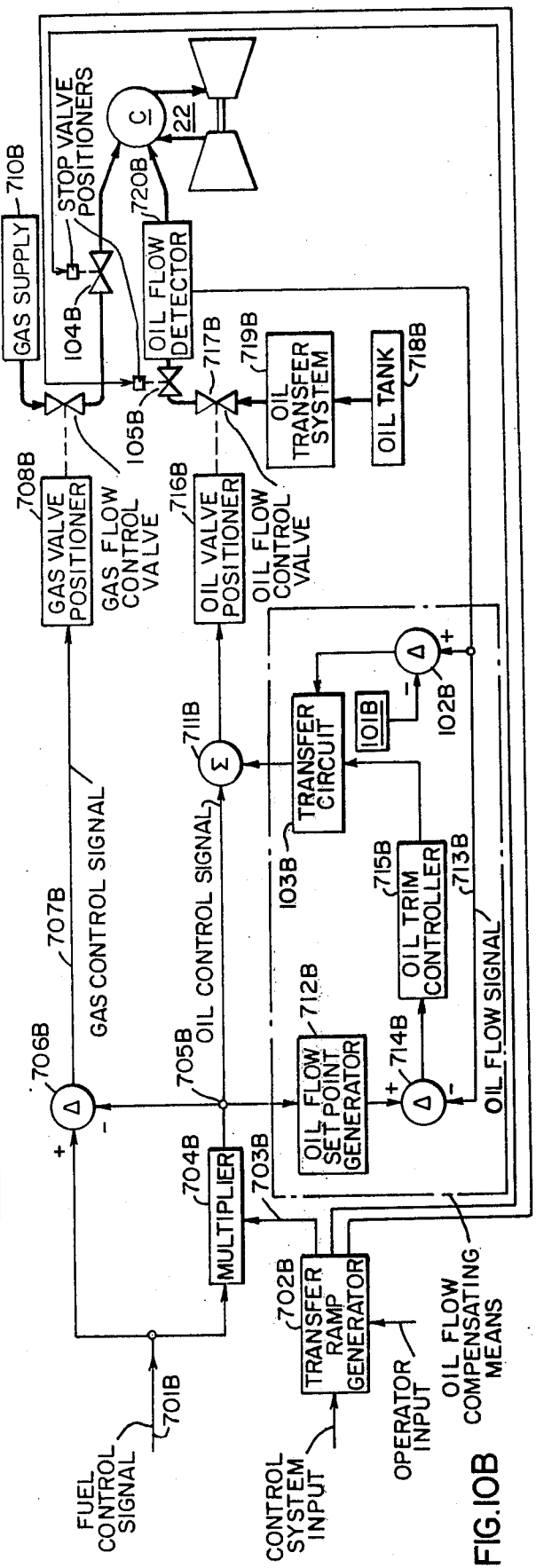
FIG.10A
FIG.10B

COMBINED CYCLE ELECTRIC POWER PLANT AND A GAS TURBINE HAVING IMPROVED LIQUID FUEL FLOW DETECTION

CROSS-REFERENCES TO RELATED APPLICATIONS

Reference is made to the following patent applications assigned to the present assignee:

1. Ser. No. 399,790, filed on Sept. 21, 1973, by L. F. Martz, R. W. Kiscaden and R. Uram, entitled "An Improved Gas Turbine And Stream Turbine Combined Cycle Electric Power Generating Plant Having A Corrdinated And Hybridized Control System And An Improved Factory Based Method For Making And Testing Combined Cycle And Other Power Plants And Control Systems Therefor". 2. Ser. No. 495,765, filed concurrently herewith by Lyle F. Martz and Richard J. Plotnick on Aug. 8, 1974 and entitled "Combined Cycle Electric Power Plant Having A Control System Which Enables Dry Steam Generator Operation During Gas Turbine Operation".

3. Ser. No. 495,702, filed concurrently herewith by Milton M. Hobbs on Aug. 8, 1974, and now abandoned, and entitled "A Combined Cycle Electric Power Plant And A Gas Turbine Having An Improved Fuel Transfer System".

4. Ser. No. 495,714, filed concurrently herewith by Lyle F. Martz on Aug. 8, 1974, and entitled "A Combined Cycle Electric Power Plant And A Gas Turbine And Afterburner Having Coordinated Fuel Transfer".

BACKGROUND OF THE INVENTION

In a combined cycle power plant that includes a gas turbine adapted to use both gas and liquid fuels, the desirability of detecting liquid fuel flow and controlling the detected flow during fuel transfer is set forth in the cross-referenced application Ser. No. 195,702 "A Combined Cycle Electric Power Plant And A Gas Turbine Having An Improved Fuel Transfer System".

Typically, a flow divider distributes liquid fuel to a plurality of gas turbine nozzles. One way to detect the total liquid fuel flow to such nozzles is to detect the differential pressure between the inlet of the flow divider and the outlet of the nozzle, and to relate the total liquid fuel flow to the dectected differential pressure. Such measurements are subject to inaccuracies resulting from varying flow/differential pressure relationships among the nozzles and their associated fuel lines. The total liquid fuel flow may be detected with improved accuracy by a fuel flowmeter connected in the fuel line leading to the inlet of the flow divider. Utilization of the flow divider to provide a signal related to the total liquid fuel flow retains the measurement accuracy that is obtainable with a separate fuel flowmeter at reduced expense, as provision and installation of a separate flowmeter are not required.

SUMMARY OF THE INVENTION

The present invention relates to a fuel transfer system for the combustor of a gas turbine that drives an electric generator in a combined cycle power plant. During fuel transfer a fuel control signal is split into first and second component signals having equal, but opposite, time rates of change, the sum of such component signals being equal to the fuel control signals. A flow of a first fuel to the combustor is controlled in accordance with the first component signal. A flow of a second fuel is distributed equally to a plurality of nozzles of the gas turbine combustor, and the total fuel flow to the plurality of nozzles is detected. The detected flow is governed according to a desired value that is related to the second component signal such that the power output that results when both the first and the second fuels flow to the combustor is dependent upon the level of the fuel control signal and independent of the relative levels of the flows of the first and second fuels.

BRIEF DESCRIPTION OF THE INVENTION

FIGS. 2A and 2B illustrate a gas turbine structure which can be employed in the plant of FIG. 1;

Figure 7:
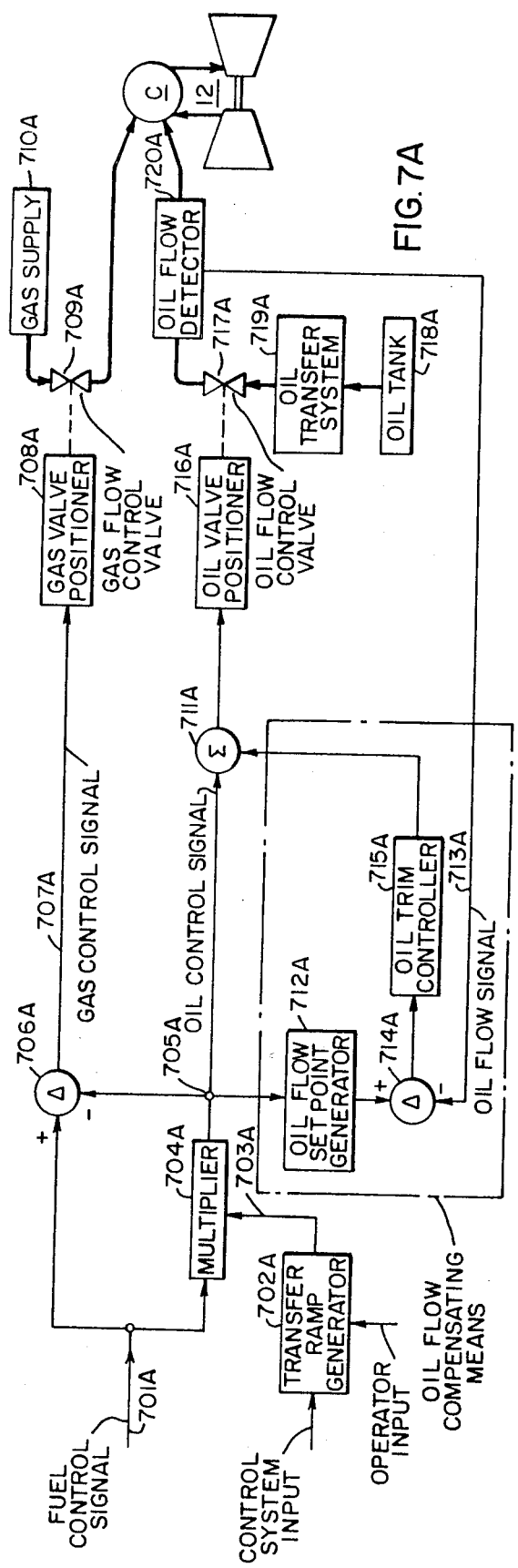
Figure 8:
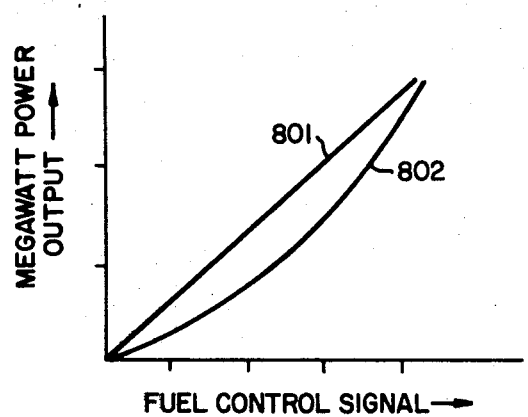
Figure 9:
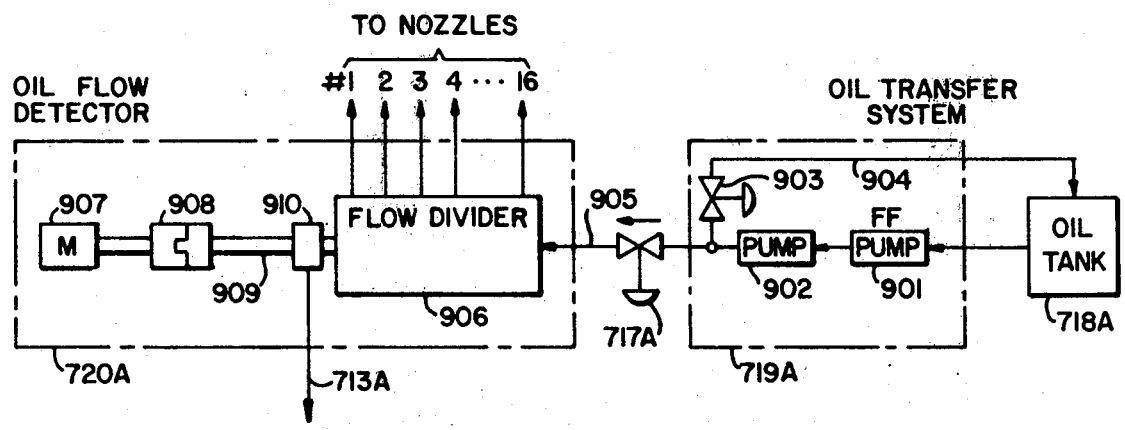

FIG. 7A and 7B schematically show gas turbine fuel transfer systems according to one embodiment of the present invention;

FIG. 8 graphically illustrates the relation between power output and fuel control signal level for gas and liquid fuels;

FIG. 9 schematically shows a liquid fuel transfer system and a liquid fuel flow detector; and FIGS. 10A and 10B schematically show gas turbine fuel transfer systems according to another embodiment of the present invention.

DESCRIPTION OF THE PREFERRED EMBODIMENT

A. General Plant Description

Figure 1:
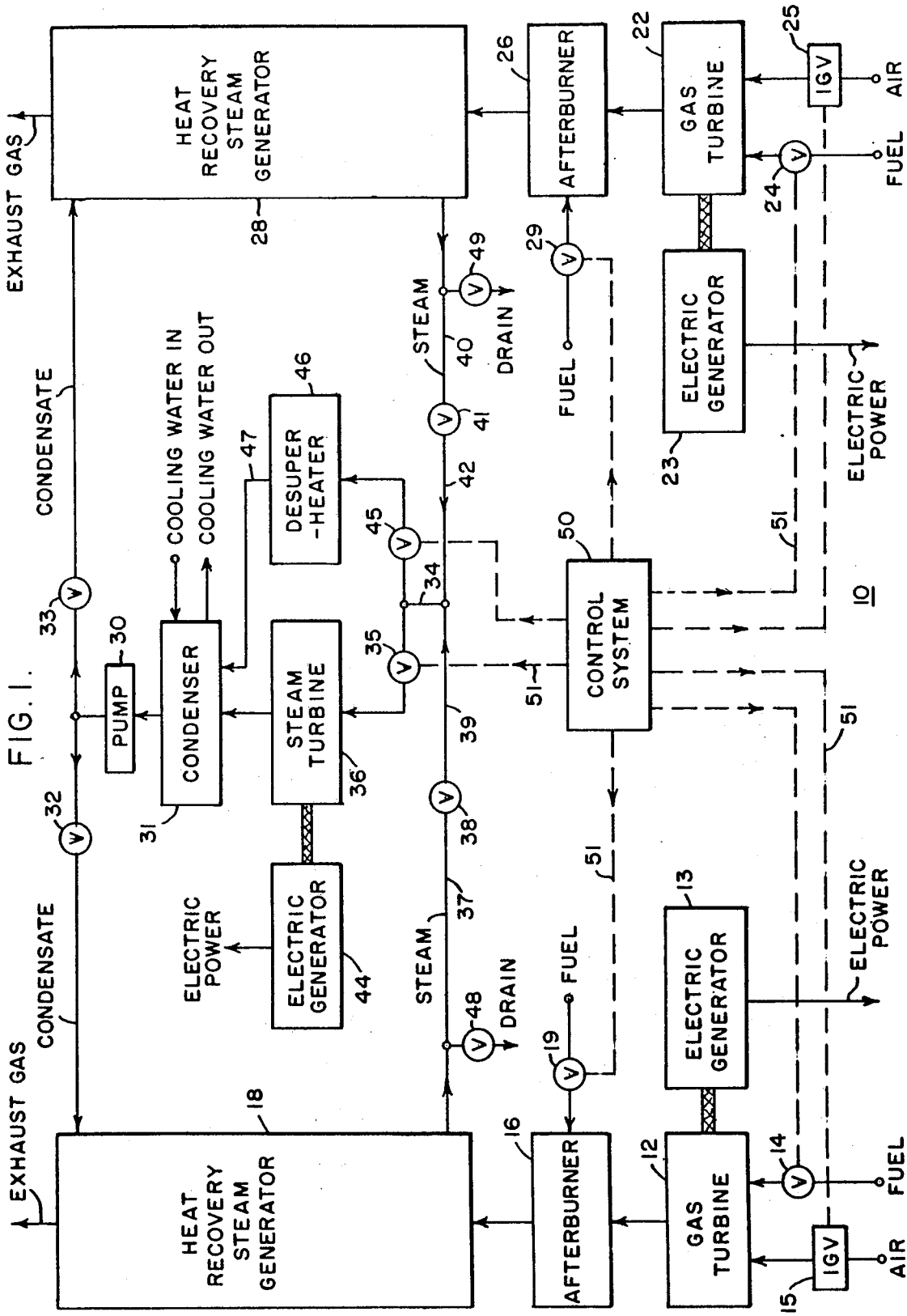
FIG. 1 shows a schematic view of a combined cycle electric power plant in which there is employed a gas turbine in accordance with the principles of the invention.

Referring to FIG. 1 of the drawings, there is shown a functional block diagram of a representative embodiment of a combined cycle electric power generating plant constructed in accordance with the present invention. Reference numeral 10 is used to identify the combined cycle plant as a whole. As such, the plant 10 includes a first gas turbine 12 (sometimes referred to as "gas turbine No. 1") which drives a first electric generator 13. Fuel is supplied to the gas turbine 12 by way of a fuel control valve or throttle valve 14. Air enters the gas turbine 12 by way of a variable inlet guide vane mechanism 15 which controls the degree of opening of the turbine air intake and which is used to adjust air flow during the startup phase and to increase part load efficiency. The fuel supplied by the throttle valve 14 is burned in the gas turbine 12 and the resulting high temperature exhaust gas is passed through an afterburner 16 and a heat recovery steam generator 18 and is thereafter exhausted into the atmosphere.

Heat recovery steam generator 18 (sometimes referred to as "heat recovery steam generator No. 1") includes therein various sets of boiler tubes which are heated to a relatively high temperature by the gas turbine exhaust gas passing through the steam generator 18. Afterburner 16 includes a burner mechanism for further increasing the temperature of the gas turbine exhaust gas before it enters the steam generator 18. Fuel is supplied to the burner mechanism in the afterburner 16 by way of fuel control valve or throttle valve 19. The primary heat source for the steam generator 18 is the gas turbine 12, the afterburner 16 being in the nature of a supplemental heat source for providing supplemental heat when needed. In terms of typical fuel usage, approximately 80% of the fuel is used in the gas turbine 12 and 20% is used in the afterburner 16.

The combined cycle plant 10 further includes a second gas turbine 22 (sometimes referred to as "gas turbine No. 2") which drives a second electric generator 23. Fuel is supplied to the gas turbine 22 by way of a fuel control valve or throttle valve 24. Air enters the gas turbine 22 by way of a variable inlet guide vane mechanism 25 which is used to adjust air flow during turbine startup and to increase part load efficiency. The fuel supplied by throttle valve 24 is burned in the gas turbine 22 and the resulting high temperature exhaust gas is passed through an afterburner 26 and a heat recovery steam generator 28 and is thereafter exhausted into the atmosphere.

Heat recovery steam generator 28 (sometimes referred to as "heat recovery steam generator No. 2") includes various sets of boiler tubes which are heated to a relatively high temperature by the gas turbine exhaust gas passing through the steam generator 28. Afterburning 26 includes a burner mechanism for further increasing the temperature of the gas turbine exhaust gas before it enters the steam generator 28. Fuel is supplied to the burner mechanism in the afterburner 26 by way of a fuel control valve or throttle valve 29. The primary heat source for the steam generator 28 is the gas turbine 22, the afterburner 26 being in the nature of a supplemental heat source for providing supplemental heating when needed. In terms of typical total fuel consumption, approximately 80% of the fuel is used in the gas turbine 22 and 20% is used in the afterburner 26.

A condensate pump 30 pumps water or condensate from a steam condenser 31 to both of the steam generators 18 and 28, the condensate flowing to the first steam generator 18 by way of a condensate flow control valve 32 and to the second steam generator 28 by way of a condensate flow control valve 33. Such condensate flows through the boiler tubes in each of the steam generators 18 and 28 and is converted into superheated steam. The superheated steam from both of the steam generators 18 and 28 is supplied by way of a common header or steam pipe 34 and a steam throttle valve or control valve 35 to a steam turbine 36 for purposes of driving such steam turbine 36. The steam from the first steam generator 18 flows to the header 34 by way of a steam pipe 37, an isolation valve 38 and a steam pipe 39, while steam from the second steam generator 28 flows to the header 34 by way of a steam pipe 40, an isolation valve 41 and a steam pipe 42.

The spent steam leaving steam turbine 36 is passed to the condenser 31 wherein it is condensed or converted back into condensate. Such condensate is thereafter pumped back into the steam generators 18 and 28 to make more steam. Steam turbine 36 drives a third electric generator 44.

A steam bypass path is provided for use at appropriate times for diverting desired amounts of steam around the steam turbine 36. This steam bypass path includes a steam turbine bypass valve 45 and a desuperheater 46, the output side of the latter being connected to the condenser 31 by way of a pipe 47. A drain valve 48 is provided for the first steam generator 18, while a drain valve 49 is provided for the second steam generator 28.

The operation of the combined cycle electric power generator plant 10 is controlled by a control system 50, typical control signal lines 51 being shown in a broken line manner. As will be seen, the control system 50 offers a choice of four different control operating levels providing four different degrees of automation. From highest to lowest in terms of the degree of automation, these control operating levels are: (1) plant coordinated control; (2) operator automatic control; (3) operator analog control; and (4) manual control. The control system 50 includes an analog control system which is constructed to provide complete and safe operation of the total plant 10 or any part thereof. The control system 50 also includes a digital computer that provides a real-time digital control system that works in conjunction with the analog control system at the higher two levels of control to coordinate and direct the operation of the analog control system. Failure of the digital control computer results in no loss of power generation because the analog control system provides for complete operation of the plant 10.

When operating at the highest level of control, namely, at the plant coordinated control level, the control system 50, amoung other things, automatically coordinates the settings of the fuel valves 14, 19, 24 and 19, the inlet guide vanes 15 and 25 and the steam turbine throttle and bypass valves 35 and 45 to provide maximum plant efficiency under static load conditions and optimum performance during dynamic or changing load conditions.

The control system 50 also enables a coordinated automatic startup or shutdown of the plant 10 such that the plant 10 can be brought from a hot standby condition to a power generating condition or vice versa in a quick, efficient and completely automatic manner. For example, the entire plant 10 can be started and brought to full load from a hot standby condition in approximately 60 minutes time by having the plant operator simply dial in the desired load setting and push a master plant start button.

As an indication of the flexibility and reliability of the power generating plant 10, it is noted that the plant 10 can be operated in any one of the following configurations: (1) using one steam turbine and two gas turbines; (2) using one steam turbine and one gas turbine; (3) using two gas turbines only; and (4) using one gas turbine only. The steam turbine 36 will, of course, not operate by itself, it being necessary to use at least one of the gas turbines 12 and 22 in order to use the steam turbine 36. In order to obtain the benefits of combined cycle operation, it is, of course, necessary to use the steam turbine 36 and at least one of the gas turbines 12 and 22. When one of the gas turbines, for example the gas turbine 12, is not being used or is shut down for maintenance purposes, then its associated steam generator 18 can be removed from the system by closing its condensate flow valve 32 and its steam isolation valve 38. When, on the other hand, the steam turbine 36 is not being used or is shut down for maintenance purposes, the steam generated by the steam generators 18 and 28 can be bypassed to the condenser 31 by way of steam bypass valve 45 and the desuperheater 46. As an alternative, when the stem turbine 36 is not being used, either one or both of the steam generators 18 and 28 can be drained and vented by the approximate setting of condensate valves 32 and 33, steam isolation valves 38 and 41 and drain valves 48 and 49. In other words, each of the steam generators 18 and 28 is constructed so that its respective gas turbine can be operated with the same generator in a dry condition.

The combined cycle plant 10 affords a high degree of reliability in that failure of any one of the major apparatus components will not reduce total plant power generation capacity by more than 50%. In this regard and by way of example only, a combined cycle plant 10 has been developed having a nominal maximum power generating capacity of 260 megawatts. In such plant, each of the gas turbines 12 and 22 is capable of producing a maximum of approximately 80 megawatts of electrical power under ISO conditions (59° Fahrenheit at sea level) and the steam turbine 36 is capable of producing a maximum of approximately 100 megawatts of electrical power. Thus, loss of any one of the turbines 12, 22 and 36, for example, would not reduce total plant capacity by as much as 50%..

It is noted in passing that the functional block diagram FIG. 1 has been simplified in some respects relative to the actual plant apparatus to be described hereinafter, this simplification being made to facilitate an initial overall understanding of the combined cycle plant 10. A major simplification in FIG. 1 concerns the fuel valves 14, 19, 24, and 29. As will be seen in the actual embodiment of the combined cycle plant described herein, provision is made for operating the gas turbines 12 and 22 and the afterburners 16 and 26 on either of two different kinds of fuel, namely, either natural gas or distillate type fuel oil. As a consequence, each of the gas turbines 12 and 22 and each of the afterburners 16 and 26 is actually provided with two fuel throttle valves, one for natural gas and the other for fuel oil. Also, various other values and devices employed in the actual fuel supply systems have been omitted from FIG. 1 for the sake of simplicity. Other simplifications employed in FIG. 1 are of a similar character.

B. Gas Turbine Mechanical Structure

Figure 2B:
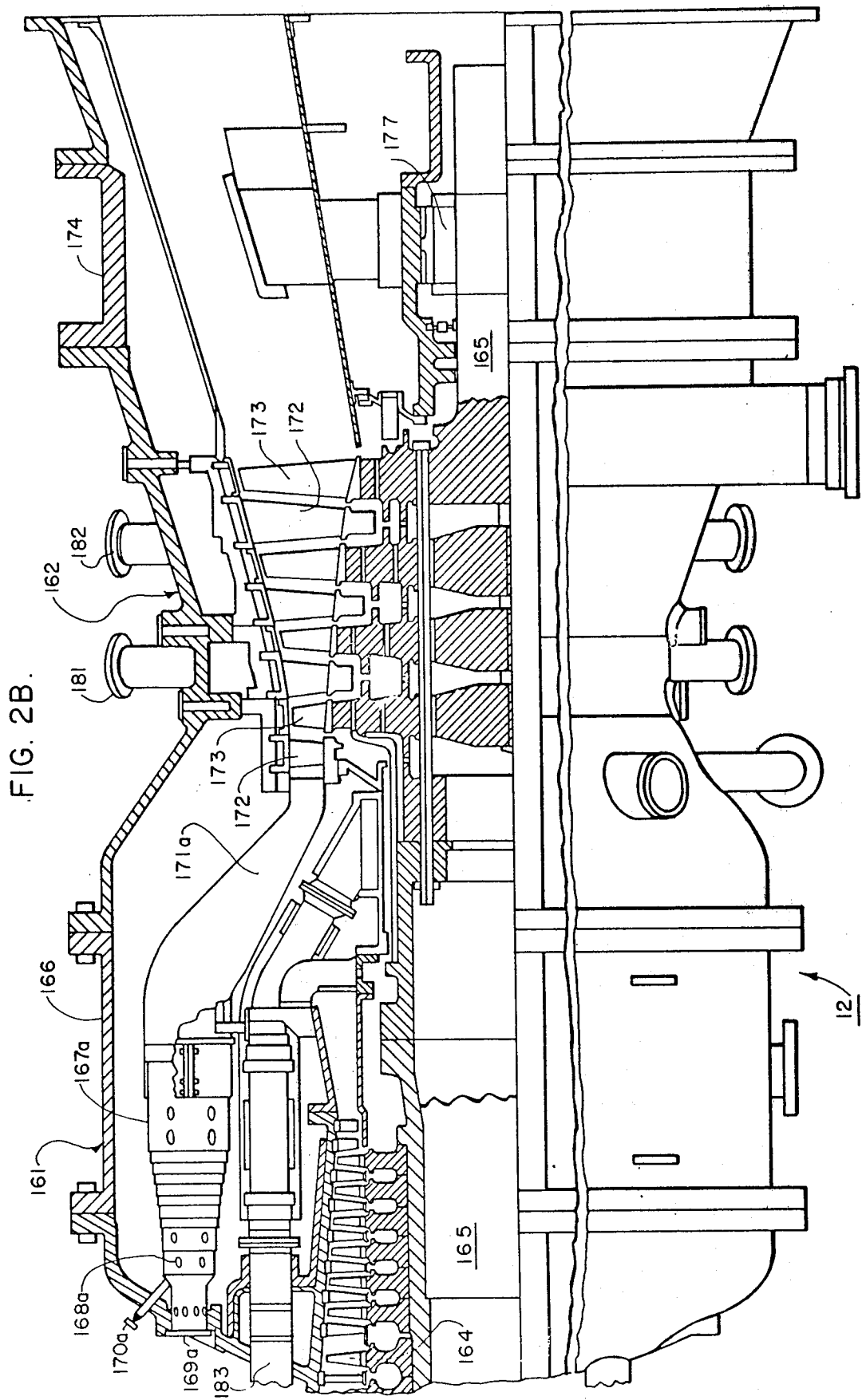

Referring now to FIGS. 2A and 2B, there is shown a longitudinal, partially cross-sectional, elevational view of the No. 1 gas turbine 12. FIG. 2A shows the left-hand half of the view and FIG. 2B shows the right-hand half of the view. The No. 2 gas turbine 22 is of this same construction and whatever is said concerning the construction of the No. 1 gas turbine 12 also applies to the No. 2 gas turbine 22. With this in mind, the gas turbine 12 is a W-501 gas turbine manufactured by Westinghouse Electric Corporation, Gas Turbine Systems Division, Lester, Pa. It is of the simple open cycle type and employs a single-shaft two-bearing construction in which no bearings are located in a high pressure, high temperature zone. It is constructed for operation at a rated speed of 3,600 rpm and is capable of driving an electric generator for producing in excess of 80 megawatts of electrical power. It includes an axial flow air compressor section 160, a combustion section 161 and a turbine section 162. The compressor section or compressor 160 is comprised of interspersed sets of stationary blades 163 and rotary blades 164, the latter being located on a rotor structure 165 which extends substantially the entire length of the gas turbine 12.

The combustion section 161 includes a combustor housing or combustor shell 166 which receives the compressed air from the compressor 160. Located in the combustor shell 166 is a set of 16 combustion chambers or combustors, one of which is indicated at 167a. These combustors 167a–167p are arranged in an evenly spaced concentric manner around the longitudinal center axis of the gas turbine 12. Considering in detail only the combustor 167a, compressed air enters the interior thereof by multiple ports 168a. Fuel enters the combustor 167a by way of a fuel nozzle 169a, a spark plug 170a serving to provide for the initial ignition of the fuel. This fuel is burned in the combustor 167a and the resulting high temperature, high pressure gas is supplied by way of a combustor outlet duct 171a to the inlet of the turbine section 162.

The turbine section 162 is a four stage turbine having interspersed sets of stationary blades 172 and rotary blades 173, the latter being located on the rotor structure 165. The high temperature high pressure gas from all of the combustors 167a–167p enters the turbine section 162 and expands through the turbine blades 172 and 173 to cause rotation of the rotary blades 173 and thereby drive the rotary blades 164 of the compressor 160 on the same rotor structure 165. The hot exhaust gas leaving the turbine section 162 exhausts axially by way of an exhaust duct 174 from whence it flows into the inlet duct for the heat recovery steam generator 18.

The variable inlet guide vane mechanism 15 is located just inside the air intake structure 175 of the compressor section 160, just ahead of the first set of compressor blades 163 and 164. The inlet guide vanes 15 are used to adjust the compressor air flow during the starting cycle and to increase part load efficiency.

The two bearings which support the single rotor structure 165 of the gas turbine 12 are indicated at 176 and 177. As seen, these bearings 176 and 177 are located outside of any high pressure high temperature zone. The electric generator 13 is coupled to the cold or compressor end 178 of the rotor structure 165 to avoid potential misalignment problems. Some air is removed from the compressor 160 by way of outlet 180, externally cooled and filtered by an air cooler and returned to the turbine section 162 to cool the first two sets of stationary blades 172 and the first set of rotary blades 173. The cooling air for the stationary blades 172 enters through inlets 181 and 182, while the cooling air for the first set of rotary blades 173 enters via inlet 183.

For more detail on the structure of other apparatus in the plant 10, reference is made to Ser. No. 495,765.

C. Plant Control System

The plant control system 50 is organized to operate the plant equipment safely through startup and loading with high reliability so that the plant is highly and quickly available to meet power demanded from it. To achieve this purpose, the plant control system is preferably embodied in digital/analog hybrid form, and the digital/analog interface is preferably disposed in a way that plant protection and plant availability are enhanced.

Generally, the total plant power is controlled by controlling the operating level of the turbines and the afterburners, but the steam turbine goes into a follow mode of operation once the steam bypass valves are closed and the steam turbine inlet valves are fully opened. In the follow mode, the steam turbine produces power at a level dependent on the steam conditions generated by the heat inputs to the steam generators.

Figure 3:
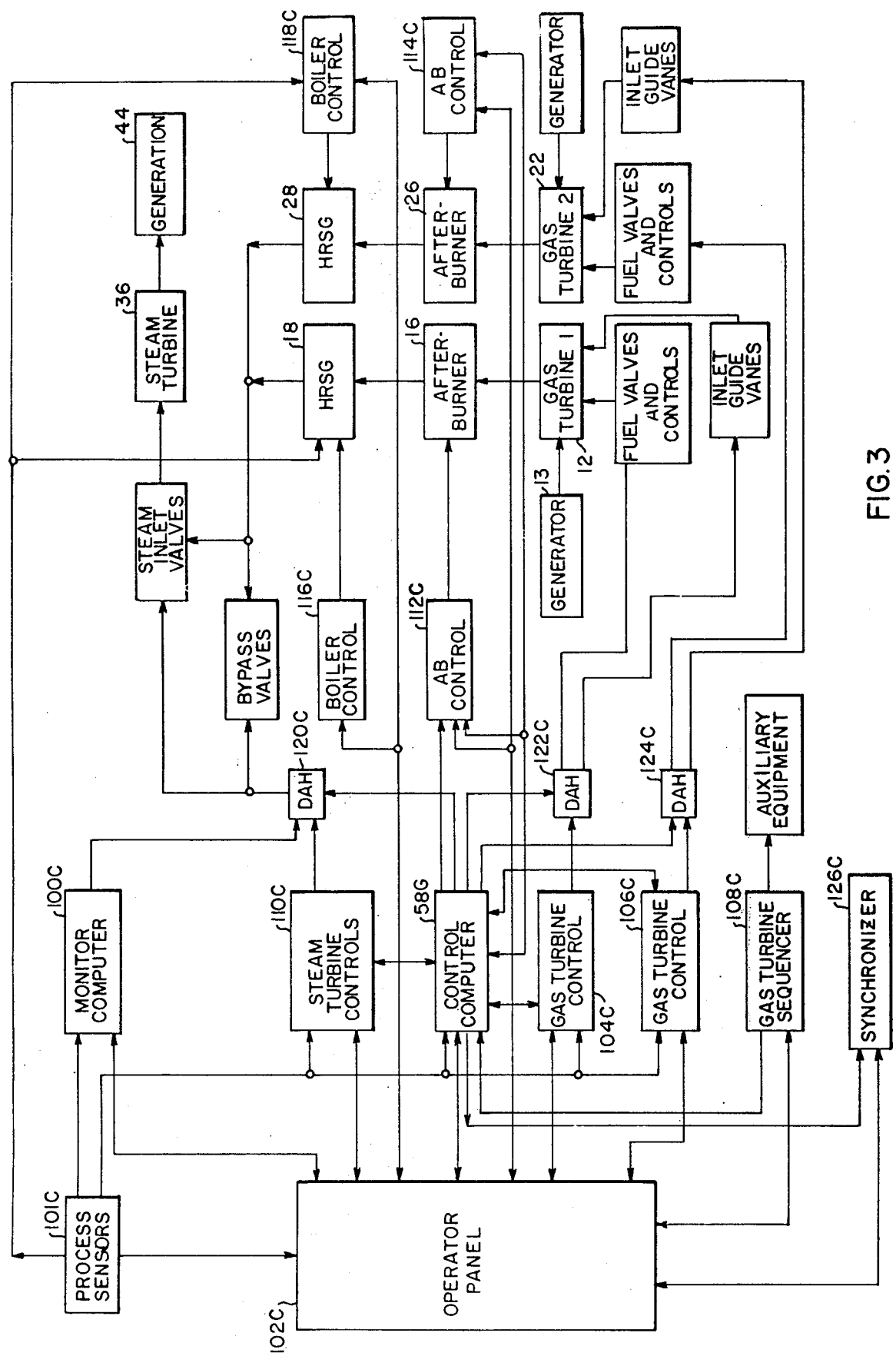
FIG. 3 shows a schematic view of a control system arrnaged to operate the plant of FIG. 1 in accordance with the principles of the invention.

As shown in FIG. 3, the control system 50 includes a digital control computer 58G, a digital monitor computer 100C and various analog controls for operating the plant equipment in response to process sensors 101C while achieving the described objectives. In this instance an automatic startup control for the steam turbine 36 is largely embodied in the monitor computer 100C. An operator panel 102C provides numerous pushbutton switches and various displays which make it possible for the plant to be operated by a single person. The pushbutton switches provide for numerous operator control actions including plant turbine mode selections and setpoint selections.

In the operator analog or manual mode of operation, the operator sets the fuel level for the gas turbines 12 and 22 through gas turbine controls 104C and 106C during loading, but an analog startup control included in each of the gas turbine controls 104C and 106C automatically schedules fuel during gas turbine startups. In addition, sequencers 108C start and stop auxiliary equipment associated with the gas turbines during gas turbine startups. The turbine bypass steam flow and the turbine steam flow are controlled by operator valve positioning implemented by a steam turbine control 110C during steam turbine startup and loading in the operator analog mode. Certain automatic control functions are performed for the steam and gas turbines by the controls 104C, 106C and 110C in the operator analog mode.

In the operator automatic mode, the computers 58G and 100C perform various control functions which provide for automatic startup and automatic loading of the gas and steam turbines under the direction of the operator on a turbine-by-turbine basis. Afterburner controls 112C and 114C and boiler controls 116C and 118C operate under operator setpoint control during the operator analog and operator automatic modes. Respective digital/analog hybrid circuits 120C, 122C and 124C interface the digital and analog controls.

Under plant coordinated control, the computer 58G generally directs the plant operation through startup, synchronization and loading to produce the plant power demand. The extent of coordinated plant control is dependent on the existing plant configuration, i.e. according to the availability of apparatus for operation or for coordinated operation. For example, if a gas turbine is shut down, it is excluded from coordination. Similarly, if the gas turbine has been excluded from coordinated control by the operator, the computer 58G will operate accordingly. In all coordinated control cases, the boiler controls 116C and 118C function separately, i.e. they react automatically to operate setpoints and signals generated by the process sensors 101C to control the steam generators according to plant conditions produced by coordinated turbine and afterburner operations. The computer 58G provides setpoint signals for the afterburners in the coordinated control mode but not in the operator automatic mode. Coordinated control provides the highest available level of plant automation, and the operator automatic and operator analog modes provide progressively less automation. Some parts of the analog controls function in all of the plant modes.

Generator synchronization is performed by a synchronizer 126C under operator control or under computer control in the coordinated mode. Generally, the respective generators are sequenced through synchronization by switching actions applied to the synchronizer inputs and outputs.

Once the plant reaches hot standby and either gas turbine or both gas turbines have been started, the steam turbine can be started when minimum steam supply conditions have been reached. Thereafter, the turbines are accelerated to synchronous speed, the generators are synchronized and the fuel and steam valves are positioned to operate the turbines at the demand load levels. The manner in which the control system 50 is configured and the manner in which it functions throughout startup and loading depends on the selected plant mode and the selected or forced plant configuration and the real time process behavior.

D. Megawatt Load Control System For Gas Turbine

Figure 4A:
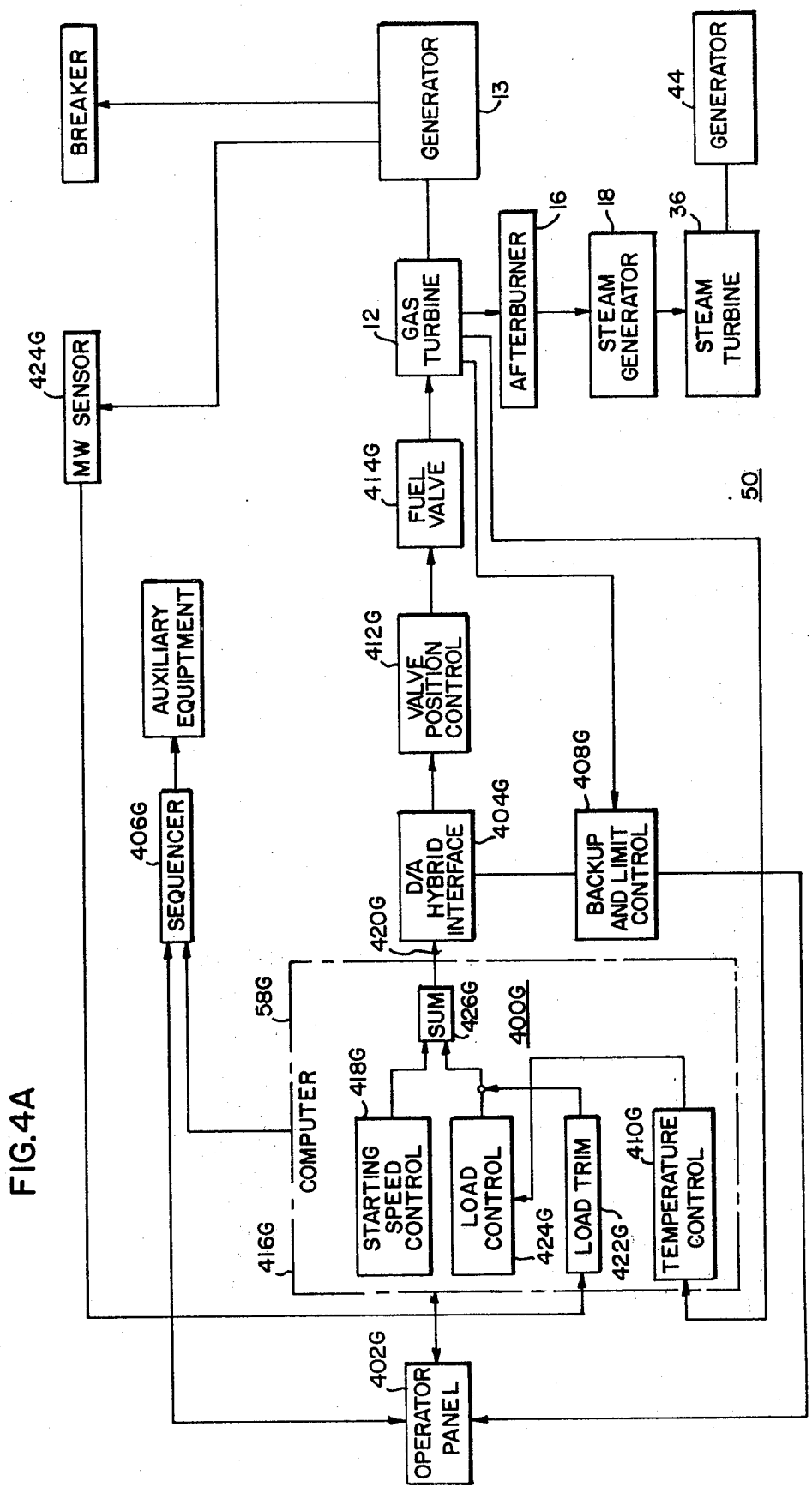
FIGS. 4A and 4B show a schematic diagram of the plant control system with elements of a megawatt load control loop illustrated to indicate more particularly the preferred manner of embodying the invention.

As shown n FIG. 4A, the preferred embodiment comprises a gas turbine megawatt load control system 400G which is included in the plant control system 50 to provide for gas turbine operation at a controlled megawatt level in response to a plant coordinated control setpoint, operator megawatt setpoint, or a remote digital dispatch megawatt setpoint. In coordinated control operation, gas turbine electrical load can accordingly be automatically and accurately controlled through control of the megawatt load generated by the operation of the gas turbines. In turn, with additional plant control, total plant electrical load is enabled to be controlled automatically and accurately. Further, in the operator automatic mode, the generated gas turbine load can be accurately set by an operator or by a remote setpoint to satisfy plant power dispatch requirements. In the latter case, turbine megawatt setpoint adjustments could be required to reach a particular dispatch plant power level according to the resultant steam turbine generated power which is combined with the gas turbine power to provide the total plant power.

The manual/automatic status of the plant control system 50 is fixed by operator selection at an operator panel 402G or by a computer rejection or failure to manual. A digital/analog hybrid interface 404G includes manual/automatic logic circuitry to detect when the gas turbine 12 is to be on manual control and to make bumpless switching operations which implement the applicable control mode.

In automatic control, a programmed digital control computer 58G generates a fuel reference from the hybrid interface 404G in the coordinated and the operator automatic modes to provide megawatt load control and to schedule fuel for automatic startup. It also initiates turbine startup by a sequencing system 406G under coordinated control. Generally, the sequencer 406G sequences the gas turbine 12 through the startup process by starting and stopping auxiliary equipment when sequencing permissives are generated, and it trips the turbine if certain conditions develop. Further, the sequencer 406G generates logicals for the turbine controls, i.e. a master relay on signal, a fuel on signal, a breaker status signal, a fuel select and transfer signal, and a flame on signal.

Megawatt control is provided in the automatic modes of operation and it is not available to the operator in the backup modes. Generally, the megawatt level of gas turbine operation in the backup modes is that which results from the manual operation of a feedforward speed/load control through raise and lower pushbuttons. More detail on the backup speed/load control load is set forth in a copending and coassigned patent applicatioin Ser. No. 495,763 entitled "A Combined Cycle Electric Power Plant And A Gas Turbine Having A Backup Control System With An Improved Feedforward Analog Speed/Load Control" and filed by J. Smith and T. Reed concurrently herewith.

With reference again to FIG. 4A, the operator controls the turbine loading operation in the backup mode by generating a fuel reference from the hybrid interface 404G through backup and limit controls 408G. The backup controls also include a simplified startup speed control which generates a feedforward fuel reference from the hybrid interface 404G during startup. Analog controls including overspeed and surge limiters function during the coordinated and operator automatic modes of operation as well as the operator analog and manual modes of operation.

An analog temperature limit control is included in the block 408G to function during the manual and operator analog modes as a limit on the fuel reference. The computer 58G provides a digital temperature limit control function 410G which acts as an override or a hold on the startup speed and load controls during the programmed computer operation in the automatic mode.

The hybrid interface 404G applies its output fuel reference to valve position control circuitry 412G which operates fuel valves 414G. As already indicated, the hybrid output fuel reference value is that value resulting from computer control or that value resulting from operator control from the control panel, subject to limit action. Transfer between automatic and manual fuel references is made bumplessly by the functioning of the hybrid interface 404G.

In the backup mode, the temperature limiter circuitry functions to limit bumplessly the fuel reference output signal from the hybrid interface 404G as required to prevent excessive blade path temperature and in turn excessive turbine inlet gas temperature. Surge and overspeed limit controls function in all modes of operation directly through the fuel valve positioning control 412G to limit the fuel demand reference for the purpose of avoiding surge operating conditions and turbine overspeed.

Figure 4B:
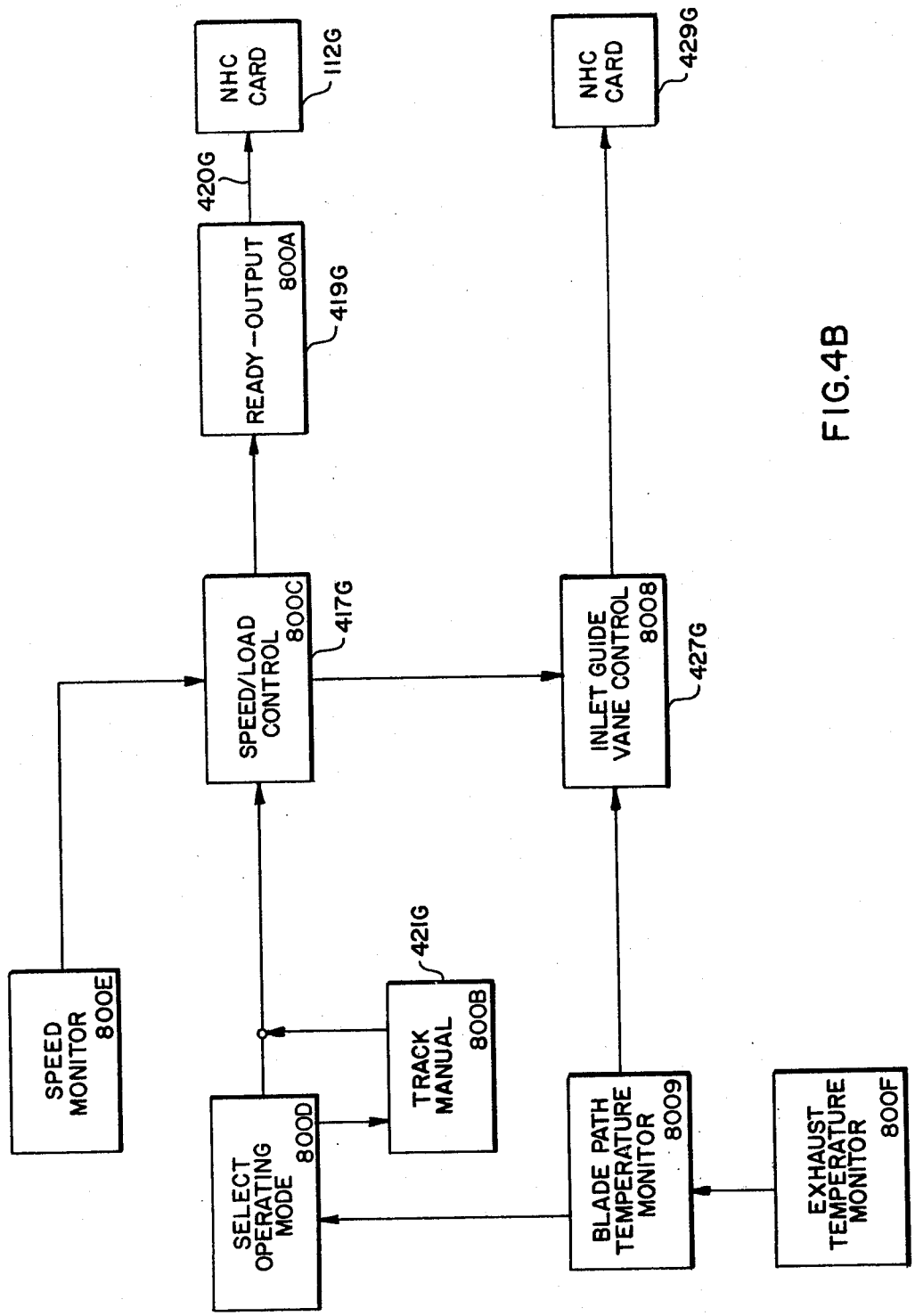
Figure 6:
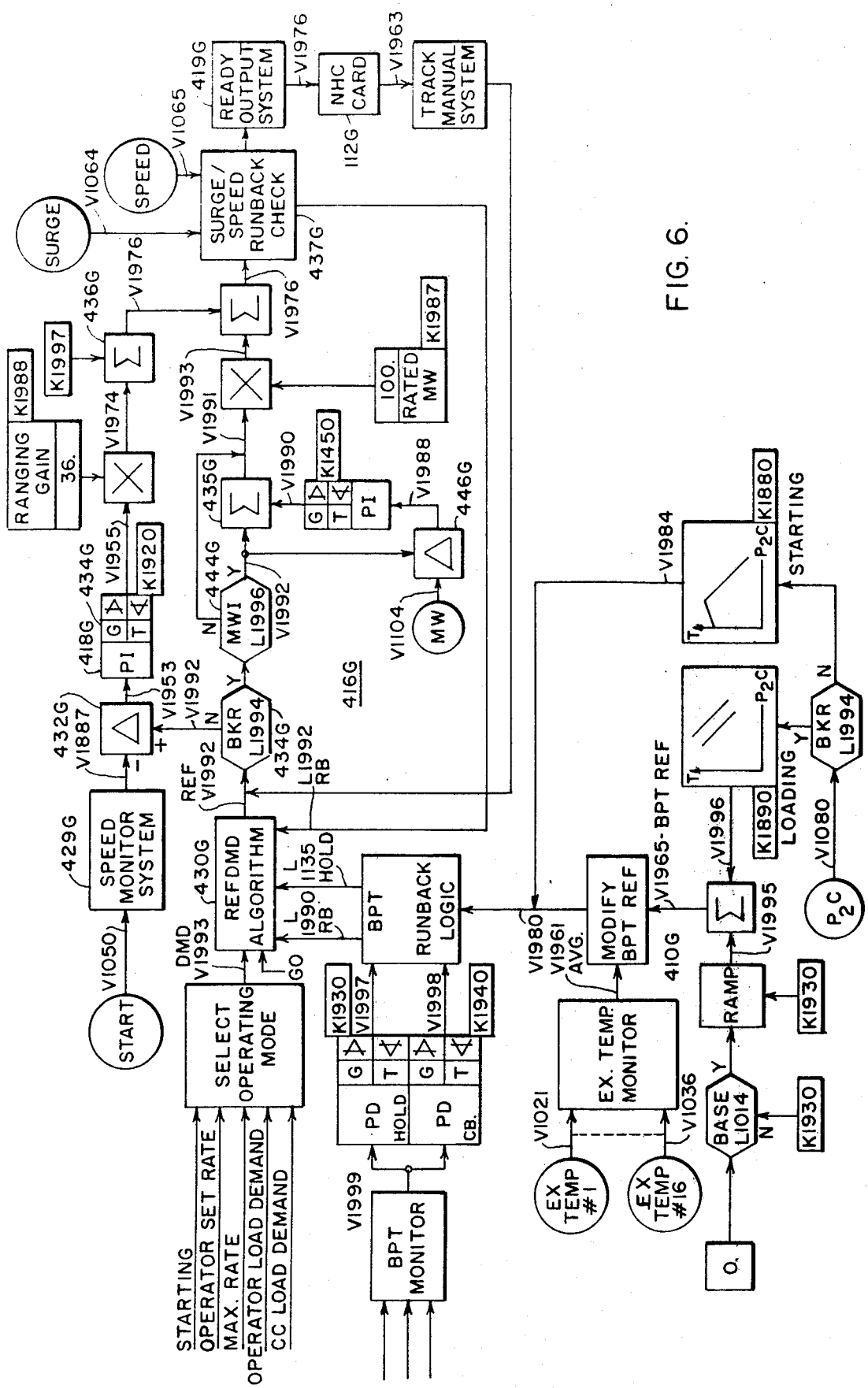
FIG. 6 shows a more detailed functional representation of various elements of the megawatt load control.

As shown in FIG. 4A, a digital fuel control 416G operates automatically and it includes the computer 58G and embodies certain elements in the megawatt load control system 400G, a system 410G for limiting blade path temperature, and a startup speed control system 418G. The megawatt load control system 400G and the startup speed control system 418G together form an automatic speed/load control system 417G (FIG. 4B) which generates a fuel reference through an output block 419G as indicated by the reference character 420G. In backup control operation, a block 421G tracks the computer fuel reference output to the hybrid interface output, i.e. the output of a fuel control NHC card 112G. In the automatic load mode, an inlet guide vane control 427G operates through another NHC card 429G and improves the plant efficiency as set forth more particularly in a copending and coassigned patent application Ser. No. 495,727 entitled "Control Apparatus For Modulating The Inlet Guide Vanes Of A Gas Turbine Employed In A Combined Cycle Electric Power Generating Plant As A Function Of Load Or Inlet Blade Path Temperature", and filed by Terry J. Reed and Jack R. Smith concurrently herewith. FIG. 6B shows the system of FIG. 4B in greater functional detail.

The load control system 400G preferably functions as a feedforward generator, and a megawatt trim control 422G preferably provides a megawatt feedback trim correction to the forward load control channel on the basis of actual megawatts generated by a sensor 423G. The startup speed control 418G preferably functions as a closed loop speed feedback control with the setpoint being varied in accordance with a speed/time characteristic and in accordance with hold and runback actions which may occur during the startup. Speed error is equal to the difference between the reference and a speed feedback from a monitor 425G and it is used as an input to a proportional plus integral controller which generates the fuel reference as a function of time.

With reference now to the startup speed control system 418G, gas turbine startup in the automatic mode is controlled from an ignition speed of approximately 900 rpm to synchronous speed. At ignition, the fuel reference is set at a fixed value and upon detection of a successful ignition the speed reference is increased to generate an increasing output reference for the fuel control. When the fuel reference from the speed loop equals the minimum fuel allowed for acceleration by a downstream low limiter, the speed loop becomes controlling. The fuel reference then increases normally in accordance with the stored speed/time characteristic. The speed control is arranged normally to make the gas turbine accelerate to synchronous speed in the same length of time from startup to startup. Reference is made to the above referenced patent application Ser. No. 399,790 for more description of the startup speed control.

At the end of the acceleration period, the gas turbine is in a run standby state at a speed of approximately 3,600 rpm and it is ready to be synchronized. The synchronizing procedure can be initiated by the operator, or in the coordinated control mode the procedure is automatically initiated. The fuel reference which exists at the time that the gas turbine reaches the run standby state is stored for subsequent use since the run standby fuel requirement varies in dependence on ambient temperature and to some extent on other variable conditions.

Generally, once a demand is applied to a load control 424G in the megawatt load control system 400G, the fuel reference is ramped from its present value toward the demand value at a specified rate. The rate can be inserted by the operator or changed dynamically by limit controls. During the time period when the fuel reference is to be ramped toward the demand value, it can be put into a HOLD state where the fuel reference value remains fixed until a GO signal is generated at which time the ramping of the fuel reference toward the demand value is resumed.

The fuel reference can also be increased or decreased as requested by external sources including an automatic synchronizer and an automatic dispatch system. The fuel reference can be adjusted to some lower value by a runback request. The computer output fuel reference is tracked to the hybrid output fuel reference when the system is operating in a backup mode to provide for a bumpless transfer.

In the operation of the megawatt load control system 400G, the load reference is proportional to megawatts and becomes a feedforward demand for fuel valve position after conversion from megawatts to valve position and correction by the megawatt feedback trim from the load trim control 422G. Temperature and other override signals hold or run back the load reference to provide protective system responses to abnormal conditions, to reduce control signal transfers and to prevent integrator windup.

Figure 5:
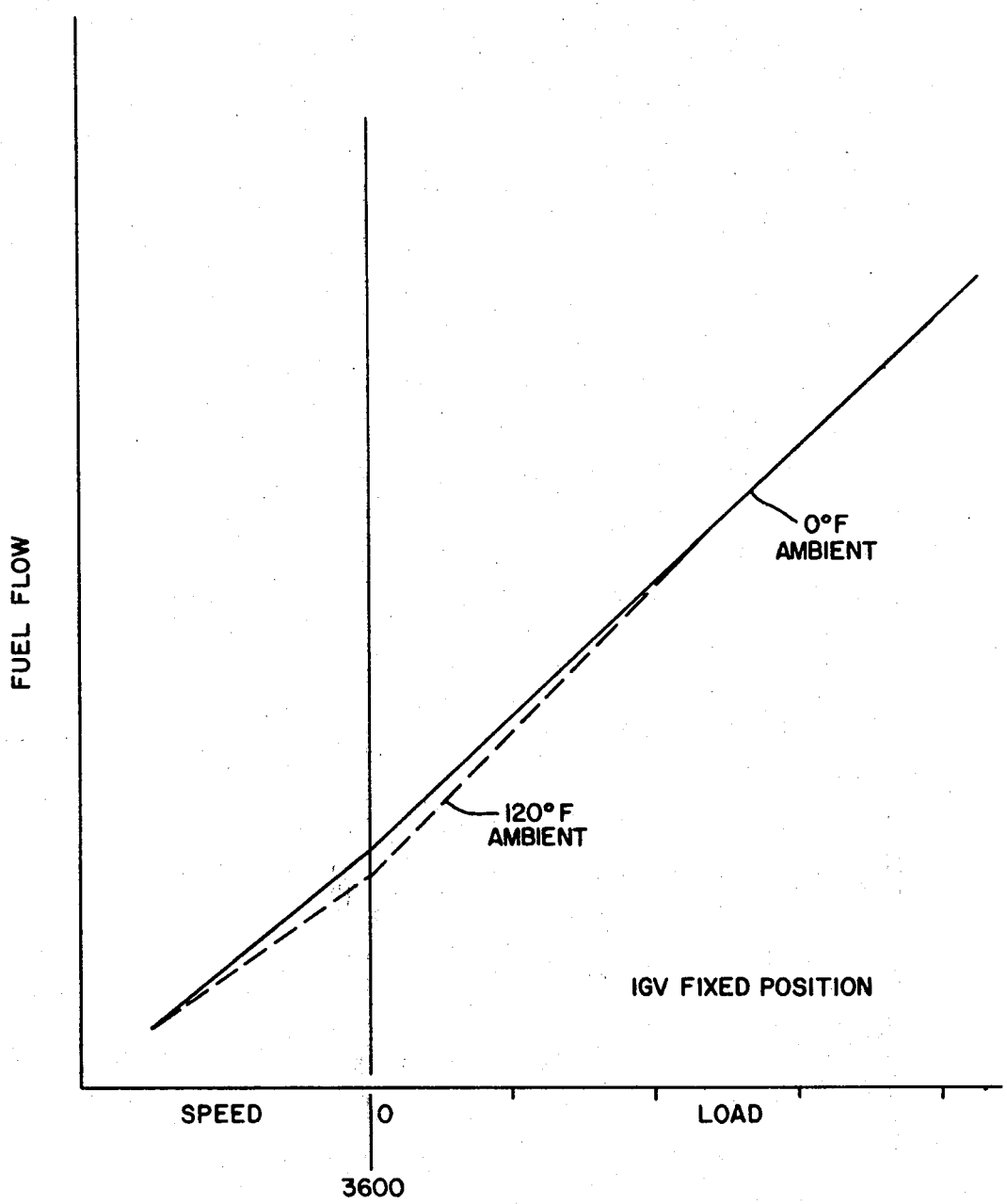
FIG. 5 shows a graphical representation of the manner in which load varies as a function of fuel flow under varying ambient temperature conditions.

A summer 426G generates the computer output fuel reference 420G as the sum of a load fuel reference plus the stored run standby or idle speed fuel reference. The system is calibrated so that the load demand is satisfied by the sum of the load fuel reference and the idle fuel reference, and accordingly the actual generated load can be quickly and accurately controlled without control system delay even though ambient conditions may vary over a period of time. Some inaccuracy can creep into the feedforward load control if the plant has been operating continuously for a long period of time and the average ambient temperature has changed significantly over that time period. However, with frequent plant starts such as more than once a week, such inaccuracy is limited to cases of short term transient ambient temperature conditions. In any case, the load trim control corrects for megawatt errors including those induced by changed ambient temperature with some control system delay time. FIG. 5 illustrates how gas turbine generated loaded varies with fuel flow for differing ambient temperatures.

If the breaker opens while operating in the load mode, the load reference is made equal to zero and the fuel reference applied by the computer 58G to the hybrid interface 404G is made equal to the stored idle fuel reference. Further, the output of the load trim 422G is made equal to zero so that it does not cause any disturbance to the speed control.

With the breaker closed, accurate megawatt control is provided by the functioning of the megawatt load control system 400G. Operator load demands or automatically generated load demands are quickly and accurately satisfied by the feedforward operation of the megawatt load control system 400G in adjusting the load level of operation of the gas turbine 12. The load trim 422G provides any minor corrections needed in the functioning of the megawatt load control system 400G.

E. Gas Turbine Fuel Transfer System

Referring now to FIGS. 7A and 7B, there is shown a fuel transfer system associated with each of the gas turbines 12 and 22. A fuel control signal is generated on a line 701A of FIG. 7A by the control system 50 (not shown) and the fuel flow to the combustor of the gas turbine 12 is controlled in accordance with the signal on the line 701A. A fuel control signal corresponding to the gas turbine 22 is generated on a line 701B of FIG. 7B by the control system 50 and the fuel flow to the combustor of the gas turbine 22 is controlled in accordance with the signal on the line 701B. The signals on the line 701A and 701B are the fuel reference signals generated from the hybrid interface 404G subject to various limits as heretofore described in Section D with reference to FIG. 4. Referring to FIG. 7A the fuel transfer system associated with the gas turbine 12 is described in detail hereinafter, using reference numerals terminating with the letter A. It is understood that the following description also relates to the fuel transfer system associated with the gas turbine 22 as shown in FIG. 7B, when the letter B is substituted for the letter A in the reference numerals which appear in the description.

A transfer ramp generator 702A generates an output signal on a line 703A that is connected to a multiplier 704A. The line 701A also is connected to the multiplier 704A. The signal on the line 703A has two steady state signal levels, namely, a first signal level corresponding to a numerical zero, in which case the output signal of the multiplier 704A is zero and the combustor of the gas turbine 12 receives a flow of gas, and a second signal level corresponding to a numerical one, in which case the output signal of the multiplier 704A is equal to the fuel control signal on the line 701A, and the combustor of the gas turbine 12 operates solely on oil. To effect fuel transfer, the output signal of the ramp generator 702A is ramped between the first and second signal levels at a predetermined ramp rate. When the signal on the line 703A is ramped between the first and second signal levels, the combustor of the gas turbine 12 operates on both gas and oil. The time of initiation and the ramp rate of such a ramp signals are controlled by a plant operator or by outputs from the control system 50, as schematically illustrated by the input arrows to the transfer ramp generator 702A labeled "operator input" and "control system input". The direction of a ramp signal, of course, depends upon the steady state level of the signal on the line 703A previous to initiation of the ramp.

The line 701A also is connected to a comparison device 706A. The output signal of the multiplier 704A is transmitted on a line 705A to the comparison device 706A, which subtracts the signal on the line 705A from the signal on the line 701A to generate a gas control signal on a line 707A. A gas valve positioner 708A positions a gas flow control valve 709A in accordance with the signal on the line 707A to control the flow of gas from a gas supply 710A to the combustor of the gas turbine 12.

The output signal of the multiplier 704A is an oil control signal that is connected to a summing device 711A and to an oil flow setpoint generator 712A. A signal representative of the flow oil to the combustor of the gas turbine 12 is generated on a line 713A. The comparison device 714A subtracts the oil flow signal on the line 713A from the output signal of the oil flow setpoint generator 712A to generate an oil flow error signal that is transmitted through a proportional-plus-integral controller 715A to the summing device 711A. The summing device 711A generates a signal representative of the sum of the oil control signal on the line 705A with the output signal of the oil trim controller 715A. An oil valve positioner 716A positions an oil flow control valve 717A in accordance with the signal from the summer 711A to control the flow of oil from an oil supply 718A through an oil transfer system 719A to the combustor of the gas turbine 12. An oil flow detector 720A is connected between the flow control valve 717A and the nozzles of the gas turbine 12 and generates the signal on the line 713A, as hereinafter described.

When the output signal of the transfer ramp generator corresponds to a numerical one, the output signal of the multiplier 704A is equal to the fuel control signal on the line 701A, and the output signal of the comparison device 706A is zero, in which case the gas valve positioner 708A holds the gas valve 709A closed, while the oil control signal on the line 705A is equal to the fuel control signal on the line 701A. When the output signals from the transfer ramp generator 702A corresponds to a numerical zero, the oil control signal from the multiplier 704A is zero while the gas control signal from the comparison device 706A is equal to the fuel control signal on the line 701A, in which case the oil valve positioner 716A holds the oil valve 717A closed.

When the output signal of the transfer ramp generator 702A is ramped between signal levels corresponding to numerical zero and numerical one to effect fuel transfer, the signals on the lines 705A and 707A are related to the fuel control signal on the line 701A in accordance with the level of the signal on the line 703A. As the signal on the line 703A increases, the oil control signal on the line 705A increases, while the gas control signal on the line 707A decreases. As the signal on the line 703A decreases, the oil control signal also decreases while the gas control signal increases. At any time, the sum of the oil control signal on the line 705A with the gas control signal on the line 707A is equal to the fuel control signal on the line 701A. During ramping of the signal on the line 703A the combined effect of the multiplier 704A and the comparison device 706A is to split the fuel control signal into the gas control signal and the oil control signal, the sum of the gas and oil control signals being equal to the fuel control signal. When the output signal from the transfer ramp generator is in the steady state, one of the gas and oil control signals is equal to the fuel control signal, while the other of those signals is equal to zero.

The oil flow setpoint controller 712A, the comparison device 714A, and the oil trim controller 715A comprise an oil flow compensating means that receives input signals from the multiplier 704A and from the oil flow detector 720A, and transmits an output signal to the summing device 711A.

Assuming for the moment that the oil flow compensating means is disconnected from the fuel transfer circuit associated with the gas turbine 12 and therefore that the input signal to the summing device 711A from the compensating means is zero, reference is made to FIG. 8 wherein the megawatt output (resulting from fuel flow to the combustor) of the power plant associated with the gas turbine 12 is shown in relation to the fuel control signal on the line 701A. A line 801 illustrates the megawatt output of such plant when the combustor of the gas turbine 12 receives a flow of gas, i.e., when the signal on the line 703A corresponds to a numerical zero. As shown by the line 801 the plant megawatt output typically varies linearly with the fuel control signal. A line 802 illustrates the megawatt output of the power plant associated with the gas turbine 12 when the combustor of such turbine receives a flow of oil, i.e., when the signal on the line 703A corresponds to a numerical one. As shown by the line 802, the plant megawatt output typically varies nonlinearly with the fuel control signal, and for a specific value of the fuel control signal the plant megawatt output is greater for gas fuel than for oil fuel, due to various nonlinearities in the oil fuel system which include, for example, nonlinearities of the oil valve positioner 708A and of the oil flow control valve 717A.

Because of the differences of megawatt outputs resulting from gas and oil fuel for the same fuel control signal value, the megawatt power output of the plant associated with the gas turbine 12 varies when the fuel system is transferred from oil to gas or from gas to oil, assuming that the oil flow compensating means is disconnected, as above stated. Thus transient errors develop between desired and detected plant megawatt output during fuel transfer, although such transient errors are detected and reduced by the megawatt load control system previously described in Section D (by varying the fuel control system to reduce such megawatt errors).

Referring again to FIG. 7A, the oil flow compensating means shown therein reduces the megawatt errors that develop during fuel transfer as a result of the previously described differences of megawatt power output when operating with gas or oil fuel at the same fuel control signal level. Within the oil flow compensating means, the oil flow setpoint generator 712A generates an oil flow setpoint that corresponds to the value of the fuel control signal on the line 701A. The value of the oil flow setpoint that is generated by the device 712A is such that the resulting megawatt power output when the gas turbine 12 operates on a flow of oil equal to the setpoint flow is the same as the megawatt power output resulting when the gas turbine 12 operates on a flow of gas as determined by the gas valve positioner 708A in response to the fuel control signal on the line 701A. The actual flow of oil to the gas turbine 12 is compared with the oil flow setpoint and a signal representing the difference, or error, between desired and detected oil flow values is transmitted to the oil trim controller 715A. The oil trim controller 715A generates an output signal that is added by the summing device 711A to the oil control signal on the line 705A to cause the oil valve 716A to vary the oil flow to reduce the oil flow error to a zero steady state value. When the oil flow error is reduced to zero, the megawatt power outputs of the power plant associated with the gas turbine 12 are the same for gas and oil at any value of the fuel control signal. In other words, the oil flow conpensating means operates to make a unit of the fuel control signal on the line 701A equally effective in producing megawatt power output, whether that unit of the fuel control signal is transmitted to the line 707A (line 703A signal represents numerical zero) or to the line 705A (line 703A signal represents numerical one). Due to the oil flow compensating means, a unit of the fuel control signal also may be split into component signals on the lines 705A and 707A (line 703A signal represents a number between zero and one) such that the sum of the component signals is equal to the unit fuel control signal, while the megawatt power output resulting from the unit of the fuel control signal is unchanged from its value when the entire unit fuel control signal is transmitted to the line 705A or to the line 707A. Thus for any value of the fuel control signal, the megawatt power output of the power plant associated with the gas turbine 12 does not vary when the signal on the line 703A is ramped.

With reference to FIG. 8 the oil flow compensating means operates to cause the plant megawatt output when operating on oil to have the same relationship to the level of the fuel control signal as the plant megawatt output when operating on gas. The curves 801 (gas) and 802 (oil) show the relationships of megawatt power output to fuel control signal level for gas and oil when the oil flow conpensating means is disconnected. When the oil flow compensating means is connected, the curve for oil is shifted to coincide with that for gas. When the relationship of megawatt power output to fuel control signal level is the same for gas and oil, the power output during fuel transfer depends upon the level of the fuel control signal, and not upon the relative levels of the signals on the lines 705A and 707A. When the relationship of megawatt power output to fuel control signal level differs between oil and gas, the power output during fuel transfer depends upon the relative levels of the signals on the lines 705A and 707A, for a constant fuel control signal, and it is the latter dependence that causes unwanted power output variation.

During fuel transfer, the signal on the line 703A is ramped between the steady state signal levels corresponding to numerical zero and numerical one. While the signal on the line 703A is ramped, the fuel control signal is split into an oil control signal on the line 705A and a gas control signal on the line 707A, with the result that the combustor of the gas turbine 12 operates on both oil and gas during fuel transfer. At such time, the effect of the oil flow compensating means is to reduce unwanted variations of the megawatt power output which otherwise result from differences of the megawatt power output between gas and oil fuels for the same fuel control signal value.

The oil transfer system 719A and the oil flow detector 702A shown in FIG. 7A are illustrated schematically in FIG. 9. An oil tank 718A stores oil at a location that is remote from the gas turbine 12. A fuel forwarding pump 901 transfers oil from the tank 718A to the inlet of the fuel pressurizing pump 902. The outlet of the fuel pressurizing pump is connected to the inlet of the oil fuel control valve 717A and to a pressure regulating valve 903. A line 904 connects the outlet of the pressure regulating valves 903 to the oil tank 718A. The pressure regulating valve 903 is positioned (by controls not shown) to control the oil pressure at the outlet of the fuel pressurizing pump 902 in accordance with a desired value. From the outlet of the oil flow control valve 717A, oil flows through a line 905 to an oil flow divider 906 that distributes oil to a plurality (sixteen) of nozzles (not shown) in the combustor of the gas turbine 12. Each of sixteen output lines of the flow divider 906 is connected to a respective one of the sixteen nozzles of the combustor of the gas turbine 12. Within the flow divider 906 oil from the input line 905 flows from a common inlet manifold to a set of sixteen separate gear pumps, the discharge of one such pump being connected to each of the sixteen output lines.

A motor 907 is connected through a clutch 908 to a drive shaft 909 that commonly turns the sixteen gear pumps in the flow divider 906. Thus each gear pump within the flow divider 906 turns at a speed that is proportional to the speed of the drive shaft 909, and all of the gear pumps turn at the same speed at any instant of time. Because the oil flow through one such gear pump is related to the speed of the pump, the oil flows through the individual gear pumps are the same at any instant of time, and the total oil flow through the combustor of the gas turbine 12 therefore is related to the speed of the drive shaft 909. A speed detecting means 910 detects the speed of the drive shaft 909 and generates an output signal on the line 713A that is related to the detected shaft speed and is representative of the total oil flow through the flow divider 906.

The motor 907 is energized to start the gear pumps within the flow divider 906 and remains energized until the torque of the drive shaft 909 reaches a predetermined value that typically corresponds to an oil flow of 3% of maximum flow, whereupon the clutch 908 disengages the motor 907 from the drive shaft 909 and deenergizes the motor 907 (by means not shown). After the motor 907 is disengaged from the drive shaft 909, the gear pumps within the flow divider 906 continue to turn at a common speed as oil flows through the line 905 at a rate that is controlled by the valve 717A. Because the gear pumps within the flow divider 906 commonly turn with the drive shaft 909, the individual oil flows through the sixteen lines to the nozzles of the combustor of the gas turbine 12 are equal, and the signal on the line 713A represents the total oil flow through the flow divider 906.

The oil transfer system 719B (see FIG. 7B) comprises a fuel forwarding pump, a fuel pressurizing pump, and a pressure regulating valve of the same description and connection as above stated with respect to the oil transfer system 719A. The oil transfer system 719B transfers oil from the oil tank 718B to the inlet of the oil flow control valve 717B. Oil from the oil flow control valve 717B flows through the oil flow detector 720B to a plurality (sixteen) of nozzles of the combustor of the gas turbine 22. The oil flow detector 720B comprises an oil flow divider, a drive shaft, a clutch and a drive motor, and a drive shaft speed detecting means of the same description and connection as above stated with respect to the oil flow detector 720A. The oil flow signal on the line 713B is generated in relation to the shaft speed detected by the speed detecting means included in the oil flow detector 720B.

Referring now to FIGS. 10A and 10B there is shown a fuel transfer system associated with each of the gas turbines 12 and 22 that includes means to control transmission of the oil trim controller output signal to its associated summing device. Additional two-position stop valves are connected in the fuel lines between a gas turbine and its associated fuel supplies With reference to FIG. 10A, a reference source 101A generates a constant output signal that is connected to a comparator 102A. The oil flow signal also is connected to the comparator 102A on the line 713A. The output signal of the reference source 101A corresponds to an oil flow that is typically 3 percent of the maximum oil flow to the combustor of the gas turbine 12. The output signal of the comparator 102A is connected to a transfer circuit 103A. Also connected to the transfer circuit 103A is the output signal of the oil trim controller 715A. The output signal from the transfer circuit 103A is connected to the summing device 711A.

The comparator 102A subtracts the reference signal generated by the source 101A from the oil flow signal on the line 713A to generate an output signal that is transmitted to the transfer circuit 103A. When the oil flow signal on the line 713A is less than the reference signal, the output signal of the comparator 102A is negative, in which case the transfer circuit 103A transmits a signal representative of zero oil trim to the summing device 711A, and the oil flow valve 717A is positioned in accordance with the oil control signal on the line 705A. When the oil flow signal on the line 713A exceeds the reference signal, the output signal of the comparator 102A is positive and the transfer circuit 103A transmits the output signal of the oil trim controller 715A to the summing device 711A, in which case the oil flow control valve 717A is positioned according to the sum of the oil control signal on the line 705A with the output signal of the oil trim controller 715A.

With reference to FIG. 9, the speed detecting means 910 includes a toothed wheel that is attached to rotate with the shaft 909 and a stationary pickup to generate magnetic pulses as the wheel teeth pass the pickup. The output signal on the line 713A is proportional to the rate of generation of such magnetic pulses. At low shaft speeds, the magnetic pulses may be relatively weak or misshapen, in which the accuracy of the oil flow signal on the line 713A may be reduced. At higher shaft speeds, the magnetic pulses generated by the stationary pickup are relatively strong, and the accuracy of the oil flow signal is improved. Referring again to FIG. 10A. the comparator 102A and the transfer circuit 103A transmit the output signal of the oil trim controller 715A to the summing device 711A when the oil flow signal on the line 713A exceeds the reference signal from the source 101A, to ensure that the oil trim controller output signal affects the position of the oil flow control valve 717A when the oil flow signal on the line 713A is of certain accuracy.

In the fuel transfer system shown in FIG. 7A, the output signal of the oil trim controller 715A is transmitted to the summing device 711A directly and therefore affects the position of the oil flow control valve at all oil flow levels. The arrangement of FIG. 7A is used when the accuracy of the oil flow signal is considered acceptable at low oil flow levels, or when the relative inaccuracy of the oil flow signal at such low flow levels is considered to have an inconsequential effect on the positioning of the oil flow control valve 717A.

The above description of the reference source 101A, the comparator 102A, and the transfer circuit 103A shown in FIG. 10A also relates to the elements 101B, 102B and 103B of the fuel transfer system associated with the gas turbine 22 shown in FIG. 10B when the letter B is substituted for the letter A in reference numerals used in the description.

With reference to FIG. 10A a two-position valve 104A is connected in the gas supply line between the gas flow control valve 709A and the combustor of the gas turbine 12. A two-position valve 105A is connected in the oil supply line between the oil flow control valve 717A and the inlet of the oil flow detector 720A. The two-position valves 104A and 105A function as isolation valves when closed. Closure of such an isolation valve eliminates small residual fuel flows which otherwise may occur when the corresponding flow control valve is closed. When open, such an isolation valve permits a flow of fuel through its associated fuel line that is controlled by the position of the flow control valve therein connected. Isolation valves 104B and 105B are connected in the fuel system associated with the gas turbine 22 (FIG. 10B) and such valves have the same description and function as the respective valves 104A and 105A.

A valve positioner is associated with each of the isolation valves 104A, 105A, 104B and 105B. The transfer ramp generator 702A includes means to generate control signals that are transmitted to the valve positioners associated with the isolation valves 104A and 105A. The transfer ramp generator 702B includes means to generate control signals that are transmitted to the valve positioners associated with the isolation valves 104B and 105B. Prior to initiation of a ramp signal on the line 703A to effect fuel transfer, the control signal that is transmitted to the valve positioner of the isolation valve 104A causes opening of such valve when the signal on the line 703A corresponds to a numerical zero; when the signal on the line 703A corresponds to a numerical one, such control signal causes closure of the isolation valve 104A. Prior to initiation of a transfer ramp signal on the line 703A, the control signal that is transmitted to the valve positioner of the isolation valve 105A causes closure of that valve when the signal on the line 704A corresponds to a numerical zero; when the signal line 703A corresponds to a numerical one, the control signal causes opening of the isolation valve 105A. When the signal on the line 703B is in a steady state prior to initiation of a transfer ramp, the isolation valves 104B and 105B are open or closed in accordance with that signal in the same manner that the isolation valves 104A and 105A are open or closed in accordance with the signal on the line 703A.

Upon initiation of a transfer ramp on the line 703A, the isolation valve 105a is opened if the transfer is from gas to oil, in that instance the isolation valve 104A is closed upon termination of the transfer ramp. If the transfer is from oil to gas, the isolation valve 104A is opened upon initiation of the transfer ramp on the line 703A, and the isolation valve 105A is closed upon termination of the ramp. The isolation valves 104B and 105B are operated similarly during a transfer ramp on the line 703B. If the transfer is from oil to gas, the isolation valve 104B is opened upon initiation of the transfer ramp, and the isolation valve 105B is closed upon termination of such ramp. If the transfer is from gas to oil, the isolation valve 105B is opened upon initiation of the transfer ramp, and the isolation valve 104B is closed upon termination of the transfer ramp.

When an isolation valve is opened or closed during fuel transfer there may be a transient fluctuation of the fuel flow to the respective gas turbine combustor due to a small residual fuel flow through the flow control valve that is connected in the line with the isolation valve. Such a transient fluctuation of the fuel flow to the combustor of a gas turbine may cause a minor transient variation of the megawatt power output of the power plant that is associated with the gas turbine. However, the megawatt load control system previously described in Section D varies the fuel control signal to the respective gas turbine combustor to reduce both the magnitude and the duration of such transient variations of the megawatt power output.

The time duration of fuel transfer is determined by the ramp rate of the transfer ramp signal, i.e., by the time required for the transfer ramp signal to change from one steady state signal level to the other. During the time interval of fuel transfer the fuel control signal associated with the gas turbine for which fuel is transferred may remain constant, or such fuel control signal may be varied by the megawatt load control system in response to a load disturbance or to a change of the megawatt load reference. In either instance the oil flow compensating means reduces unwanted variations of the megawatt power output which otherwise would result from differences of such power output between gas and oil fuels for the same fuel control signal value as heretofore explained. Reduction of such unwanted megawatt power output variation diminishes the magnitude of transient megawatt power output errors and improves the response of the megawatt load control system to changes of megawatt load reference or to other megawatt power output disturbances which may occur during transfer.

While there has been described herein what is considered to be the preferred embodiments of the invention, modifications of the invention may occur to those skilled in the art, and it is of course intended to cover all such modifications as they fall within the true spirit and scope of the invention.

I claim:

1. A fuel transfer system for a gas turbine combustor adapted to use first and second fuels, said gas turbine being rotatably coupled to drive an electric generator in a combined cycle power plant, said fuel transfer system comprising, means to generate a fuel control signal, means to split the fuel control signal into first and second component signals having equal, but opposite, time rates of change, the sum of the first and second component signals being equal to the fuel control signal, means to control a flow of the first fuel to the gas turbine combustor in accordance with the first component signal, means to divide a flow of the second fuel into a plurality of separate, but equal flows, each such flow being conducted to a respective one of a plurality of nozzles of said gas turbine combustor, means to detect the total flow of the second fuel to the plurality of gas turbine combustor nozzles and generate a signal representative of the detected total flow, and means responsive to the second component signal and to the detected flow signal to control the flow of the second fuel to an inlet of said flow dividing means such that the power output that results when both the first and the second fuels flow to the combustor is dependent upon the level of the fuel control signal and independent of the relative levels of the flows of the first and second fuels.

2. A fuel transfer system according to claim 1 wherein said means to control the flow of the first fuel comprise, first valve means connected to control the flow of the first fuel to the gas turbine combustor, and means to position said first valve means in accordance with the first component signal.

3. A fuel transfer system according to claim 1 wherein said means to control the flow of the second fuel comprise, second valve means connected to control the flow of the second fuel to the inlet of said flow dividing means, means responsive to the second component signal to generate a signal representative of a desired flow of the second fuel to the gas turbine combustor, and means to position said second valve means to reduce a difference between the desired and detected flow signals.

4. A fuel transfer system according to claim 3 wherein said means to position said second valve means comprise, means to generate a trim signal in accordance with a difference between the desired and detected flow signals, and means to position said second valve means in accordance with the sum of the second component signal with the trim signal.

5. A fuel transfer system according to claim 4 wherein the trim signal is the sum of a signal that is proportional to a difference between the desired and detected flow signals, with a signal that is proportional to the time integral of such difference.

6. A fuel transfer system according to claim 4 further comprising, means responsive to the detected flow signal to control transmission of the trim signal to said means to position said second valve means, whereby said second valve means is positioned in accordance with the second component signal when the level of the detected flow signal is less than a predetermined minimum level.

7. A fuel transfer system according to claim 1 wherein said means to split the fuel control signal comprise, means to generate a ramp signal between first and second steady state signal levels, means to generate the second component signal as the product of the fuel control signal with the ramp signal, and means to generate the first component signal as the difference between the fuel control signal and the second component signal.

8. A fuel transfer system for a gas turbine combustor adapted to use first and second fuels, said gas turbine being rotatably coupled to drive an electric generator in a combined cycle power plant, said fuel transfer system comprising, means to generate a fuel control signal, means to split the fuel control signal into first and second component signals having equal, but opposite, time rates of change, the sum of the first and second component signals being equal to the fuel control signal, means to control a flow of the first fuel to the gas turbine combustor in accordance with the first component signal, a flow divider, said flow divider comprising a plurality of separate gear pumps that are connected to rotate with a common shaft, each such gear pump having an inlet that is connected to a common fuel inlet manifold and an outlet that is connected to a respective one of a plurality of nozzles of the gas turbine combustor, means to detect the rotational speed of the common shaft of said flow divider and generate a first signal in relation to the detected speed, the first signal being representative of the total fuel flow from the flow divider to the plurality of nozzles of the gas turbine combustor, and means responsive to the first signal and to the second component signal to control the flow of the second fuel to the common inlet manifold of said flow divider, such that the power output that results when both the first and the second fuels flow to the gas turbine combustor is dependent upon the level of the fuel control signal and independent of the relative levels of the flows of the first and second fuels.

9. A fuel transfer system according to claim 8 wherein said means to control the flow of the first fuel comprise, first valve means connected to control the flow of the first fuel to the gas turbine combustor, and means to position said first valve means in accordance with the first component signal.

10. A fuel transfer system according to claim 9 wherein said means to control the flow of the second fuel comprise, second valve means connected to control the flow of the second fuel to the common inlet manifold of said flow divider, means responsive to the second component signal to generate a second signal representative of a desired flow of the second fuel to the gas turbine combustor, and means to position said second valve means to reduce the difference between the first and second signals.

11. A fuel transfer system according to claim 10 wherein said means to position said second valve means comprise, means to generate a trim signal in accordance with a difference between the first and second signals, and means to position said second valve means in accordance with the sum of the trim signal with the second component signal.

12. A fuel transfer system according to claim 11 wherein the trim signal is the sum of a signal that is proportional to a difference between the first and second signals, with a signal that is proportional to the time integral of such difference.

13. A fuel transfer system according to claim 11, further including a fuel startup system, said fuel startup system comprising, a motor having an output shaft, and a clutch to engage the output shaft of said motor to the common shaft of said flow divider for purposes of starting a flow of the second fuel through said flow divider, said clutch being arranged to disengage the output shaft from the common shaft when the shaft torque increases to a predetermined level.

14. A fuel transfer system according to claim 13 further comprising, means responsive to the first signal to control transmission of the trim signal to said means to position said second valve means, whereby said second valve means is positioned in accordance with the second component signal when the level of the first signal is less than a predetermined minimum level.

15. A fuel transfer system for a gas turbine combustor adapted to use first and second fuels, said gas turbine being rotatably coupled to drive an electric generator in a combined cycle power plant, said system comprising, means to generate a fuel control signal, means to split the fuel control signal into first and second component signals having equal, but opposite, time rates of change, the sum of the first and second component signals being equal to the fuel control signal, means to control a flow of the first fuel to the gas turbine combustor in accordance with the first component signal, means responsive to the second component signal to generate a signal representative of a desired flow of the second fuel to the gas turbine combustor, means to detect the flow of the second fuel to the gas turbine combustor and generate a signal representative of the detected flow, and means to vary the flow of the second fuel to reduce a difference between the desired and detected flow signals, whereby the power output of the generator during fuel transfer depends upon the level of the fuel control signal, and not upon the relative levels of the first and second components.

16. A fuel transfer system according to claim 15 wherein said means to split the fuel control signal comprise, means to generate a ramp signal between first and second steady state signal levels, means to generate the second component signal as the product of the fuel control signal with the ramp signal, and means to generate the first component signal as the difference between the fuel control signal and the second component signal.

17. A fuel transfer system according to claim 15 wherein said means to control a flow of the first fuel comprise, first valve means connected to control the flow of the first fuel to the gas turbine combustor, and means to position said first valve means in accordance with the first component signal.

18. A fuel transfer system according to claim 15 wherein said means to vary the flow of the second fuel comprise, second valve means connected to control the flow of the second fuel to the gas turbine combustor, means to generate a trim signal in accordance with a difference between the desired and detected flow signals, and means to position said second valve means in accordance with the sum of the second component signal with the trim signal.

19. A fuel transfer system according to claim 18 wherein said trim signal generating means comprise, means to generate an error signal representative of a difference between the desired and detected flow signals, and means to generate the trim signal in response to the error signal, wherein the trim signal is the sum of a signal that is proportional to the error signal, with a signal that is proportional to the time integral of the error signal.

* * * * *